(12) United States Patent
Halford

(10) Patent No.: US 8,128,077 B2
(45) Date of Patent: *Mar. 6, 2012

(54) RECONFIGURABLE TOOLING SYSTEM FOR SUPPORTING A WORKPIECE

(75) Inventor: Ben John Halford, Rutland (GB)

(73) Assignee: Surface Generation, Ltd.

( * ) Notice: Subject to any disclaimer, the term of this patent is extended or adjusted under 35 U.S.C. 154(b) by 879 days.

This patent is subject to a terminal disclaimer.

(21) Appl. No.: 12/066,830

(22) PCT Filed: Sep. 14, 2006

(86) PCT No.: PCT/GB2006/003409
§ 371 (c)(1),
(2), (4) Date: Jul. 9, 2008

(87) PCT Pub. No.: WO2007/031754
PCT Pub. Date: Mar. 22, 2007

(65) Prior Publication Data
US 2009/0056517 A1   Mar. 5, 2009

(30) Foreign Application Priority Data
Sep. 14, 2005 (GB) .................................. 0518743.0

(51) Int. Cl.
| | |
|---|---|
| B23Q 3/00 | (2006.01) |
| B23Q 7/00 | (2006.01) |
| B25B 11/00 | (2006.01) |
| B23P 13/04 | (2006.01) |
| B23P 19/00 | (2006.01) |
| B21D 37/02 | (2006.01) |

(52) U.S. Cl. .............. 269/266; 269/21; 29/557; 29/558; 29/700; 72/413

(58) Field of Classification Search .................. 269/266, 269/21; 29/557–559, 521, 700, 743, 759, 29/281.1; 72/413, 414
See application file for complete search history.

(56) References Cited

U.S. PATENT DOCUMENTS
3,442,044 A * 5/1969 Quercetti ...................... 446/124
(Continued)

FOREIGN PATENT DOCUMENTS
WO 02064308 A 8/2002
(Continued)

OTHER PUBLICATIONS
International Search Report mailed Dec. 6, 2006, in international application No. PCT/GB2006/003409, filed Sep. 14, 2006.
(Continued)

Primary Examiner — Lee D Wilson
Assistant Examiner — Alvin Grant
(74) Attorney, Agent, or Firm — Young Law Firm, P.C.

(57) ABSTRACT

This invention relates to a tooling system comprising a plurality of elements (22, 24, 26, 28, 30, 32, 34, 36, 38, 40, 42, 44, 46, 48, 50, 52, 54, 56, 58, 60, 62, 64) having tessellating sides arranged in an array. The elements of the array being movable between a closed position in which the elements contact one another, and an open position in which the elements of the array are spaced apart. In the open position the elements are capable of vertical movement relative to one another. Drive means for opening and closing the array are provided and the elements are mounted on supporting rails (2, 4, 6, 8, 10, 12, 14) and are driven by the drive means between the open position and the closed position along a drive axis which is at angle to the longitudinal axis of the supporting rails.

7 Claims, 8 Drawing Sheets

U.S. PATENT DOCUMENTS

| | | | |
|---|---|---|---|
| 3,660,214 A * | 5/1972 | Nichols et al. | 428/48 |
| 3,748,752 A * | 7/1973 | Quercetti | 434/96 |
| 3,834,087 A * | 9/1974 | Dunn | 451/401 |
| 3,904,053 A * | 9/1975 | Yatagai et al. | 414/416.11 |
| 4,013,865 A * | 3/1977 | Jones | 219/78.11 |
| 4,133,537 A * | 1/1979 | Chappell | 273/241 |
| 4,752,063 A * | 6/1988 | Nagy | 269/266 |
| 4,936,560 A * | 6/1990 | Barozzi | 269/266 |
| 5,121,907 A * | 6/1992 | Engwall | 269/21 |
| 5,168,635 A * | 12/1992 | Hoffman | 33/561.1 |
| 5,364,083 A * | 11/1994 | Ross et al. | 269/21 |
| 5,988,618 A * | 11/1999 | Meintrup et al. | 269/266 |
| 6,012,314 A * | 1/2000 | Sullivan et al. | 72/14.8 |
| 6,202,275 B1 * | 3/2001 | Cioletti et al. | 29/407.05 |
| 6,209,188 B1 * | 4/2001 | Soderberg et al. | 29/559 |
| 6,533,533 B1 * | 3/2003 | Heston | 414/791.6 |
| 6,547,058 B2 * | 4/2003 | Ouellette | 198/432 |
| 6,578,399 B1 * | 6/2003 | Haas et al. | 72/57 |
| 7,048,267 B2 * | 5/2006 | Bries | 269/41 |
| 7,125,010 B2 * | 10/2006 | Moore et al. | 269/266 |
| 7,347,313 B2 * | 3/2008 | Berdelle-Hilge | 198/459.1 |
| 7,610,790 B2 * | 11/2009 | Halford | 72/413 |
| 7,736,120 B2 * | 6/2010 | Pierson et al. | 414/792.6 |
| 2009/0020936 A1 * | 1/2009 | Halford | 269/266 |

FOREIGN PATENT DOCUMENTS

| | | |
|---|---|---|
| WO | 2005061147 A | 7/2005 |

OTHER PUBLICATIONS

Written Opinion mailed Dec. 6, 2006, in international application No. PCT/GB2006/003409, filed Sep. 14, 2006.

International Preliminary Report on Patentability mailed Sep. 20, 2007, international application No. PCT/GB2006/003409, filed Sep. 14, 2006.

* cited by examiner

RECONFIGURABLE TOOLING SYSTEM FOR SUPPORTING A WORKPIECE

The present invention relates to an improved tooling system, in particular to a reconfigurable modular tooling system.

It is known from WO 02/064308 A1 to provide a tooling system comprising a plurality of elements arranged in an array, the elements of the array being movable between a closed position in which the elements contact one another and are secured in position, and an open position in which the elements of the array are spaced apart and are capable of vertical movement relative to one another, and drive means for opening and closing the array.

In the tooling systems specifically described in WO 02/064308 A1, the elements are mounted on supporting rails to form an array, the supporting rails being arranged parallel to one another and being provided with drive means to drive the support rails apart to move the elements of the array between the closed and open positions.

The elements are mounted on the supporting rails such that the vertices of adjacent elements, having diagonals which are aligned in the closed position, touch one another. In order to separate the vertices of adjacent elements, adjacent elements are mounted on separate supporting rails.

Because of the diagonal alignment of the elements, the closed array has a saw edge. For some applications of the tooling system, it may be a disadvantage that the saw edge halves of the elements located on the periphery of the array are not usable as part of the working area of the tool.

Similarly, for certain applications of the tooling system, it may be a further disadvantage of the known array, that where the elements are clamped in the closed position by means of a bolster, the bolster has to have a saw tooth edge to match the peripheral profile of the closed array.

It is an object of the present invention to provide an improved tooling system in which the above disadvantages are released or substantially obviated.

It is a further object of the present invention to provide an improved tooling system which is particularly adapted for tools which have a high aspect ratio, i.e. tools which are relatively elongated in shape.

The present invention provides a tooling system comprising a plurality of elements arranged in an array, the elements of the array being movable between a closed position in which the elements contact one another and are secured in position, and an open position in which the elements of the array are spaced apart and are capable of vertical movement relative to one another, and drive means for opening and closing the array, wherein the elements have tessellating sides and the sides of adjacent elements contact one another in the closed position; the elements are mounted on supporting rails which are driven by the drive means between the open position and the closed position along a drive axis at an angle to the longitudinal axis of the supporting rails.

The elements are preferably substantially rectangular in plan and the drive axis is substantially parallel to the sides of these elements.

The supporting rails may be mounted at an angle of 45° to the drive axis or at a smaller angle, for example 30°.

The supporting rails are preferably provided with engagement means adapted to co-operate with the drive means and located perpendicular to the drive axis.

The elements of the array may be provided with inter-element interlocking features, to improve the alignment of the elements and the strength of the array.

A tooling system will now be described with reference to the accompanying drawings, in which.

Figure 1:
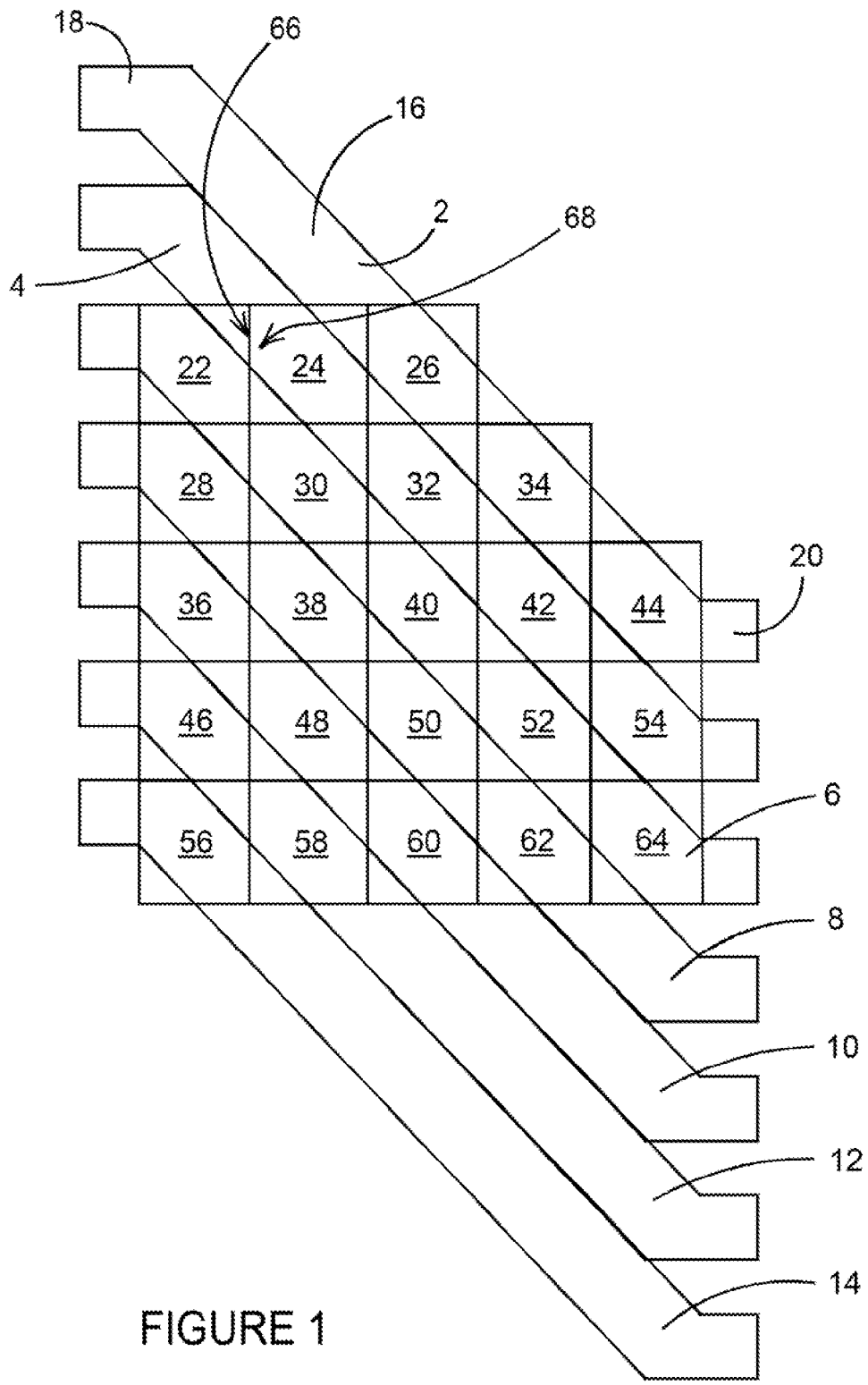
FIG. 1 is a plan view from above of the supporting rails and elements of a first embodiment of a tooling system, in the closed position.

As can be seen from FIG. 1, a plurality of supporting rails 2, 4, 6, 8, 10, 12, 14 are arranged in an array. Each of the rails 2, 4, 6, 8, 10, 12, 14 is identical and comprises an elongate section 16 which terminates at each end in an angled portion 18, 20, set at angle of approximately 45° to the longitudinal axis of the elongate section 16. Each of the angled portions 18, 20 includes means (not shown) for mounting the rail on the drive means (not shown) for driving in the direction shown by the arrow A. A plurality of elements 22, 24, 26, 28, 30, 32, 34, 36, 38, 40, 42, 44, 46, 48, 50, 52, 54, 56, 58, 60, 62, 64 are mounted on the rails, the sides 66, 68 of adjacent elements 22, 24 contacting each other.

Figure 2:
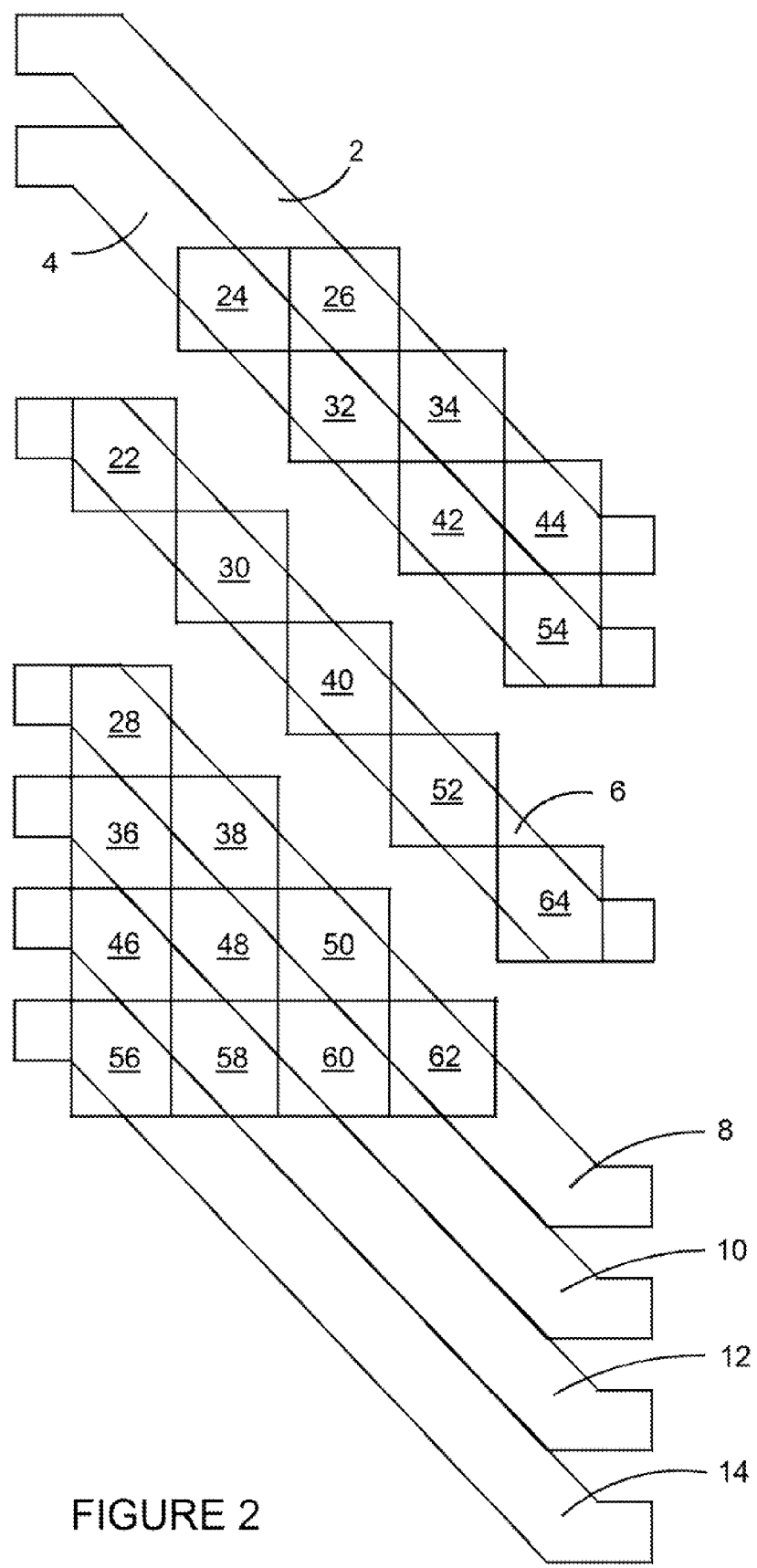
FIG. 2 is a plan view from above of the tooling system of FIG. 1 in the open position.

In FIG. 2, the array of FIG. 1 is shown in an open position. As can be seen from FIG. 2, the rails 2 and 4 together with the elements 24, 26, 32, 34, 42, 44, and 54 mounted on these rails have been moved away from the rail 6. The rail 6 has itself been moved away from the rail 8, so that the elements 22, 30, 40, 52 and 64 do not contact adjacent elements by means of their sides but only contact adjacent elements mounted on the same rail at their vertices. In this configuration each of the elements 22, 30, 40, 52 and 64 can independently be moved vertically relative to the other elements according to the method described in WO 02/064308 A1.

Figure 3:
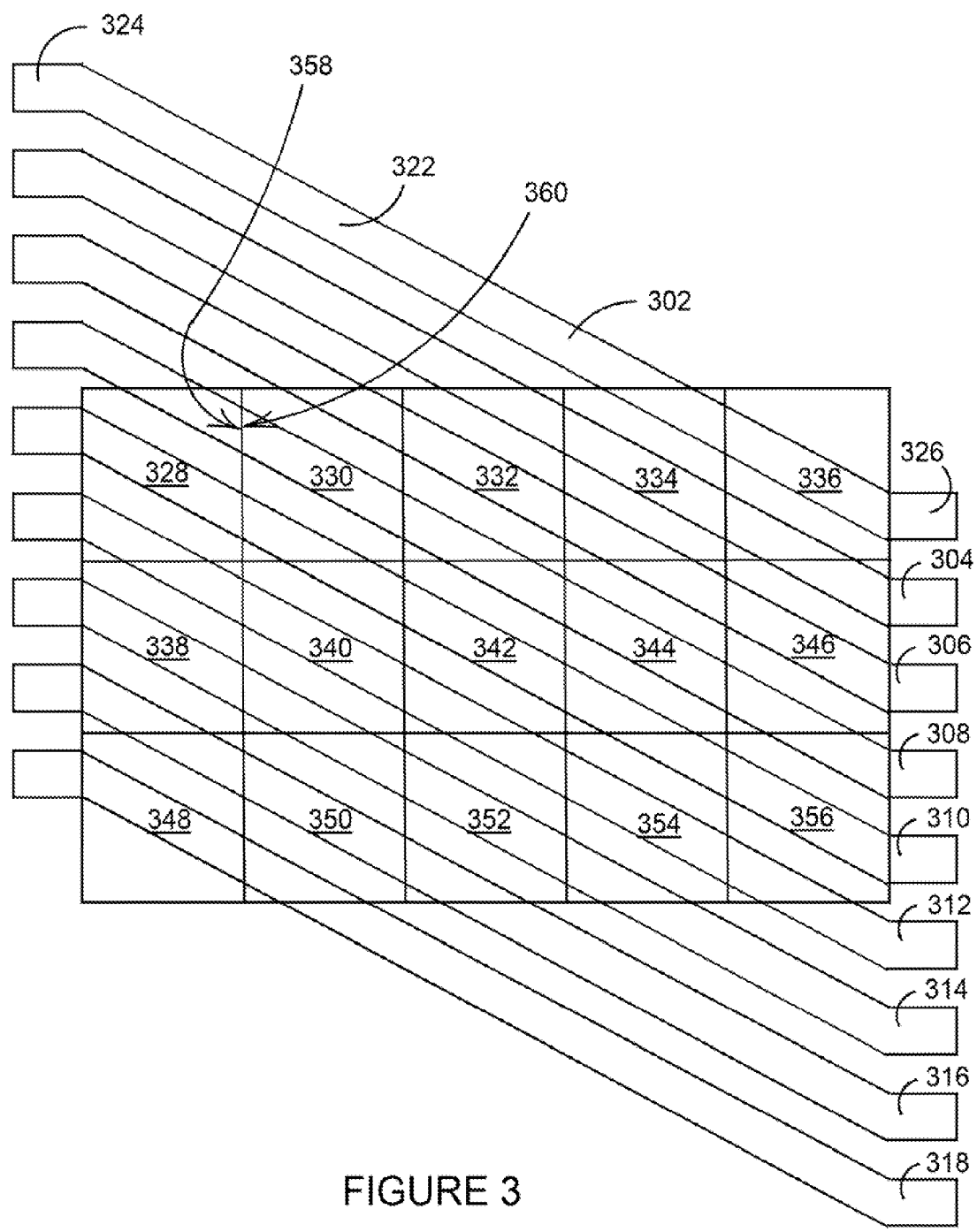
FIG. 3 is a plan view from above of the supporting rails and elements of a second embodiment of a tooling system, in the closed position.
Figure 4:
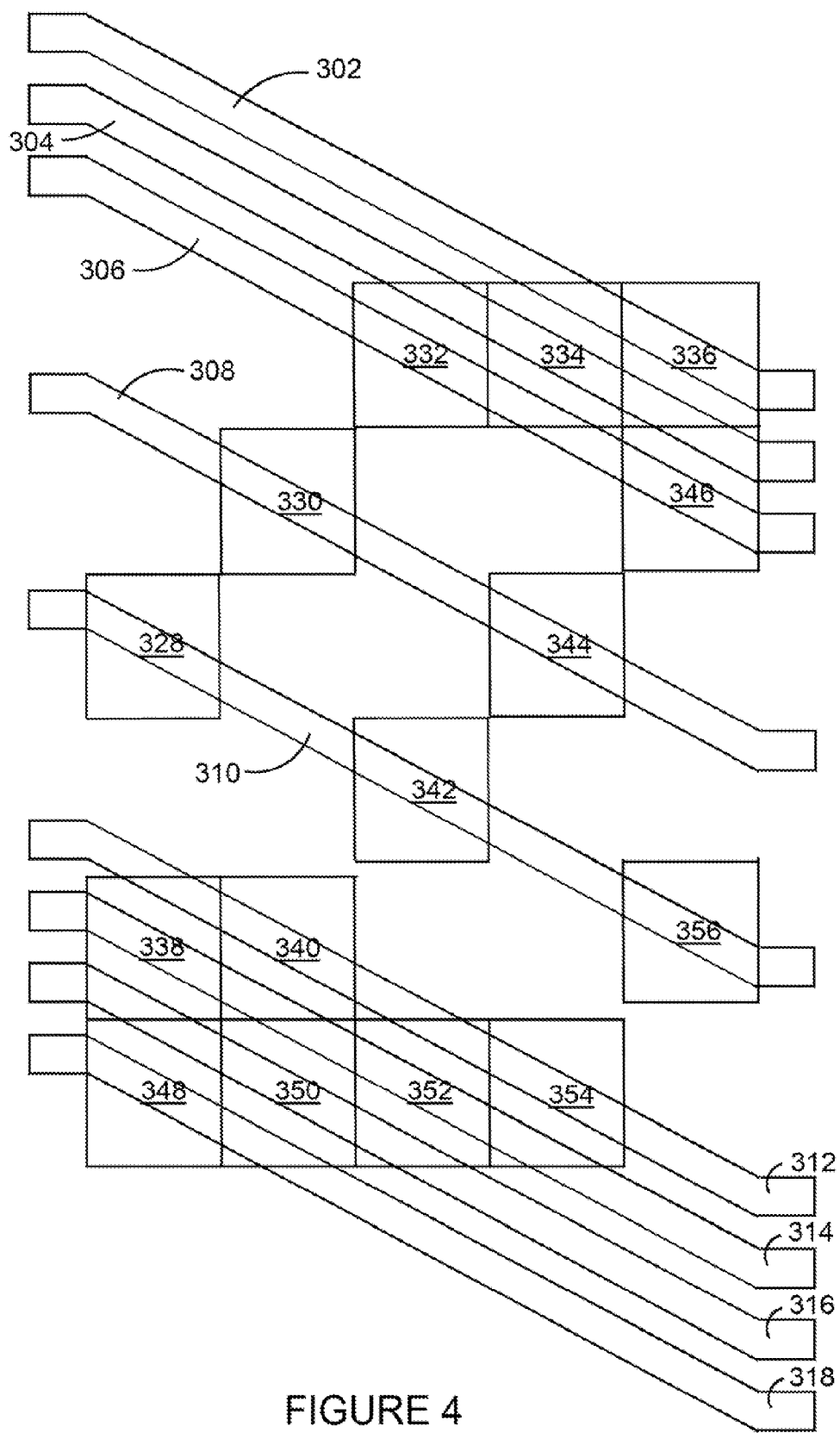
FIG. 4 is a plan view from above of the tooling system of FIG. 3 in the open position.

In the second embodiment of a tooling system as shown in FIGS. 3 and 4, a plurality of supporting rails 302, 304, 306, 308, 310, 312, 314, 316, 318 are arranged in an array. Each of the rails 302, 304, 306, 308, 310, 312, 314, 316, 318 is identical and comprises an elongate section 322 which terminates at each end in an angled portion 324, 326, set at angle of approximately 30° to the longitudinal axis of the elongate section 322. Each of the angled portions 324, 326 includes means (not shown) for mounting the rail on the drive means (not shown) for driving in the direction shown by the arrow A. A plurality of elements 328, 330, 332, 334, 336, 338, 340, 342, 344, 346, 348, 350, 352, 354, 356 are mounted on the rails, the sides 358, 360 of adjacent elements 328, 330 contacting each other.

In FIG. 4, the array of FIG. 3 is shown in an open position. As can be seen from FIG. 4, the rails 302, 304, 306 together with the elements 332, 334, 336, 346 mounted on these rails have been moved away from the rail 308. The rail 308 has itself been moved away from the rail 310, and the rail 310 has itself been moved away from the rail 312 so that the elements 328, 330, 342, 344 and 356 do not contact adjacent elements. In this configuration each of the elements 328, 330, 342, 344 and 356 can independently be moved vertically relative to the other elements according to the method described in WO 02/064308 A1.

Figure 5:
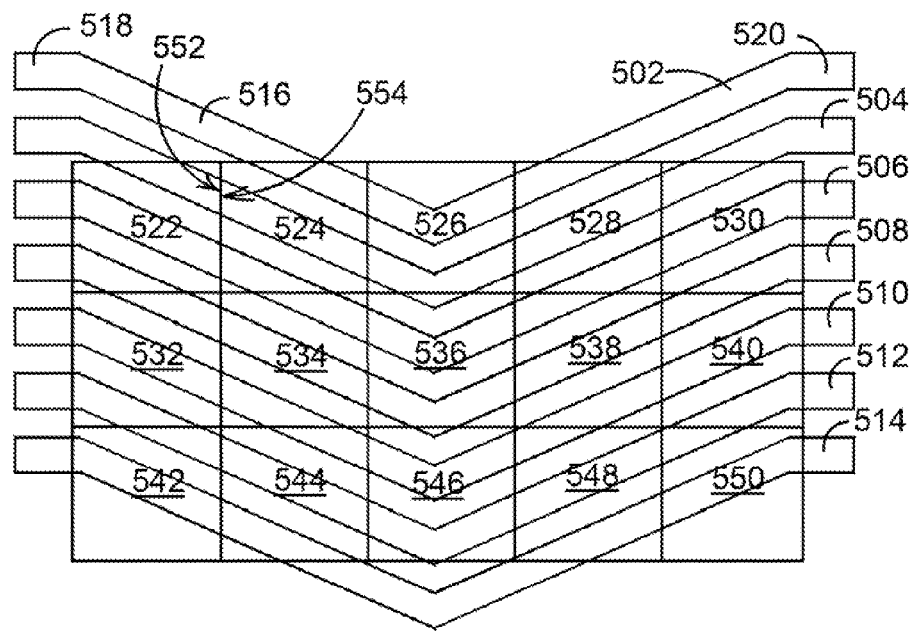
FIG. 5 is a plan view from above of the supporting rails and elements of a third embodiment of a tooling system, in the closed position.
Figure 6:
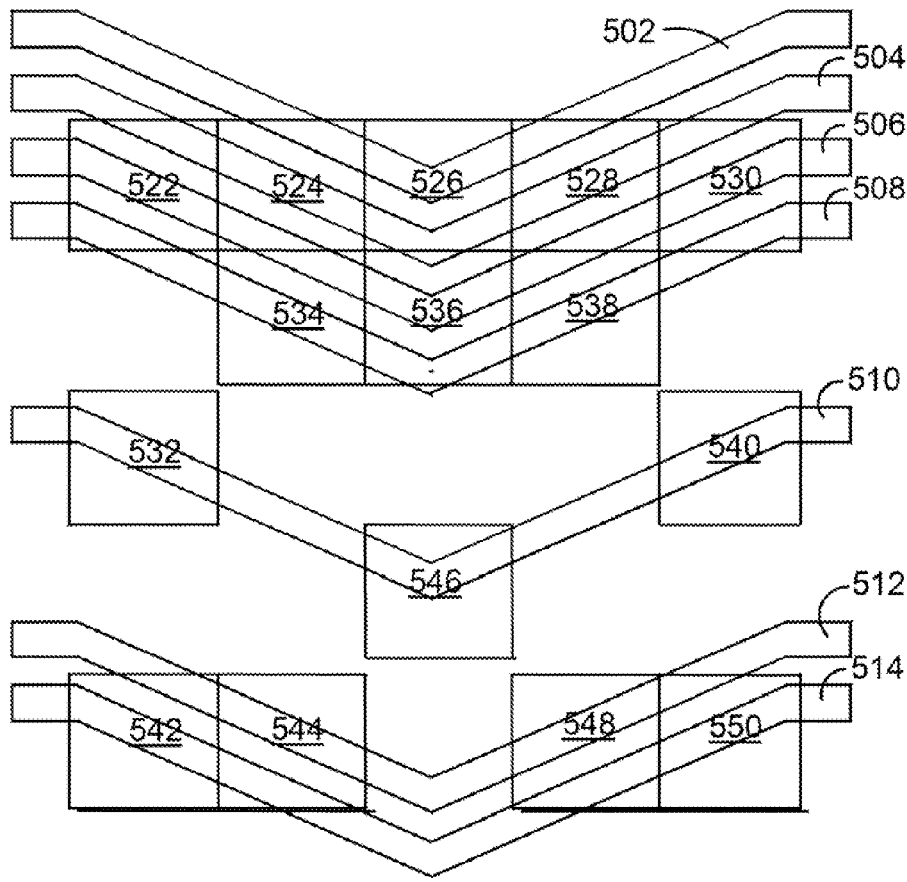
FIG. 6 is a plan view from above of the tooling system of FIG. 5 in the open position.

In the third embodiment of a tooling system as shown in FIGS. 5 and 6, a plurality of supporting rails 502, 504, 506, 508, 510, 512, 514 are arranged in an array. Each of the rails 502, 504, 506, 508, 510, 512, 514 is identical and comprises an elongate chevron section 516 which terminates at each end in an angled portion 518, 520 set at angle of approximately 30° to the longitudinal axis of the elongate chevron section 516. Each of the angled portions 518, 520 includes means (not shown) for mounting the rail on the drive means (not shown) for driving in the direction shown by the arrow A. A plurality of elements 522, 524, 526, 528, 530, 532, 534, 536, 538, 540, 542, 544, 546, 548, 550 are mounted on the rails, the sides 552, 554 of adjacent elements 522, 524 contacting each other.

In FIG. 6, the array of FIG. 5 is shown in an open position. As can be seen from FIG. 6, the rails 502, 504, 506, 508 together with the elements 522, 524, 526, 528, 530, 534, 536, 538, mounted on these rails have been moved away from the rail 510. The rail 510 has itself been moved away from the rail 512, so that the elements 532, 540, 546 do not contact adjacent elements. In this configuration each of the elements 532, 540, 546 can independently be moved vertically relative to the other elements according to the method described in WO 02/064308 A1.

Figure 7:
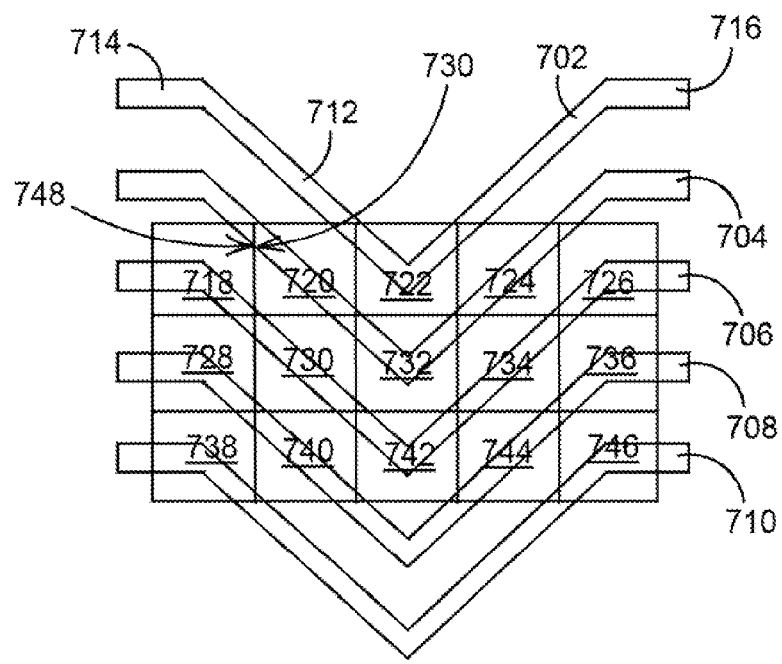
FIG. 7 is a plan view from above of the supporting rails and elements of a fourth embodiment of a tooling system, in the closed position.

As can be seen from FIG. 7, a plurality of supporting rails 702, 704, 706, 708, 710 are arranged in an array. Each of the rails 702, 704, 706, 708, 710 is identical and comprises an elongate chevron section 712 which terminates at each end in an angled portion 714, 716, set at angle of approximately 45° to the longitudinal axis of the elongate section 712. Each of the angled portions 714, 716 includes means (not shown) for mounting the rail on the drive means (not shown) for driving in the direction shown by the arrow A. A plurality of elements 718, 720, 722, 724, 726, 728, 730, 732, 734, 736, 738, 740, 742, 744, 746 are mounted on the rails, the sides 748, 750 of adjacent elements 718, 720 contacting each other.

Figure 8:
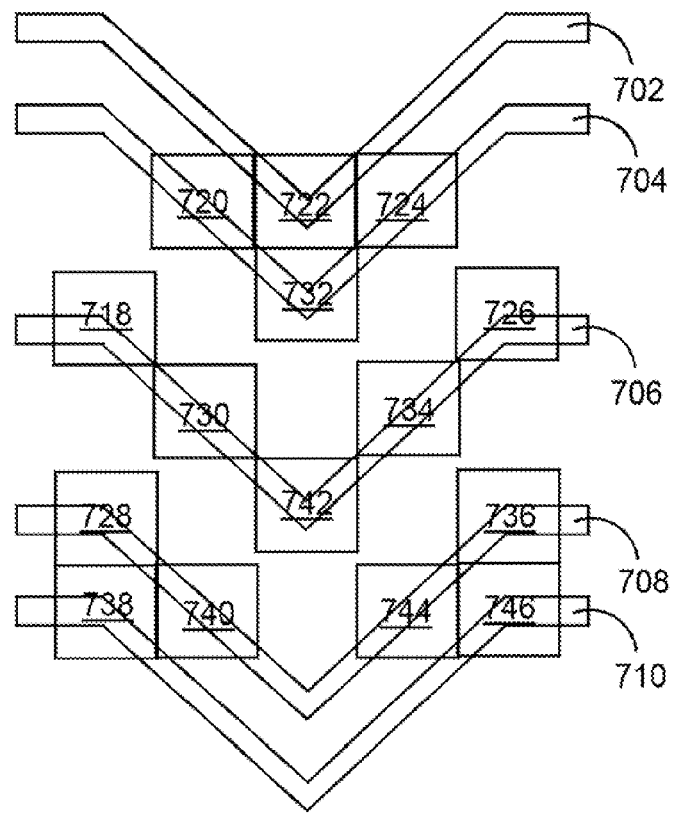
FIG. 8 is a plan view from above of the tooling system of FIG. 7 in the open position.

In FIG. 8, the array of FIG. 7 is shown in an open position. As can be seen from FIG. 8, the rails 702 and 704 together with the elements 720, 722, 724 and 732 mounted on these rails have been moved away from the rail 706. The rail 706 has itself been moved away from the rail 708, so that the elements 718, 726, 730, 734 and 742 do not contact adjacent elements by means of their sides but only contact adjacent elements mounted on the same rail at their vertices. In this configuration each of the elements 718, 726, 730, 734 and 742 can independently be moved vertically relative to the other elements according to the method described in WO 02/064308 A1.

Figure 9:
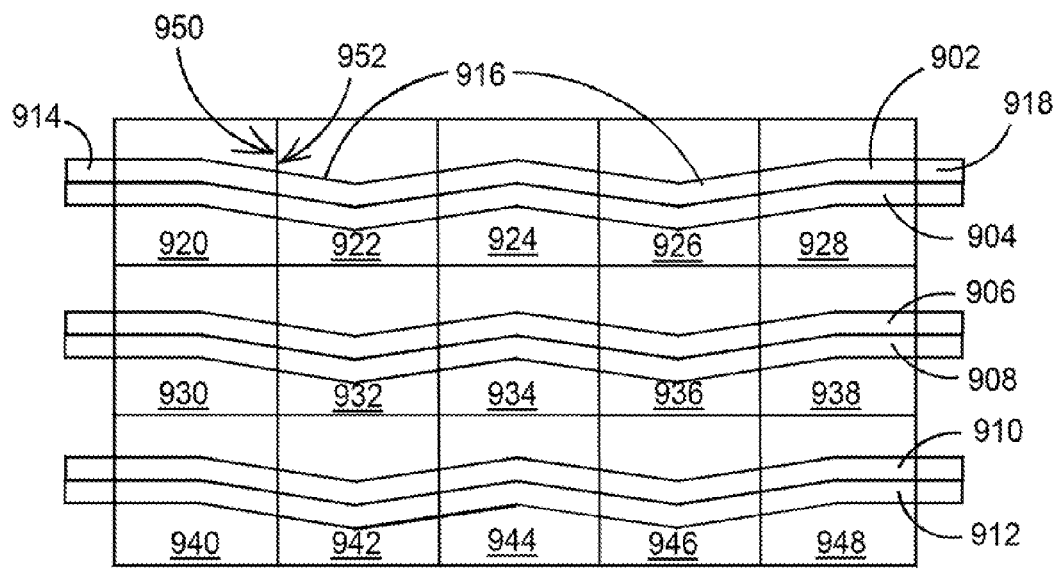
FIG. 9 is a plan view from above of the supporting rails and elements of a fifth embodiment of a tooling system, in the closed position.

As can be seen from FIG. 9, a plurality of supporting rails 902, 904, 906, 908, 910, 912 are arranged in an array. Each of the rails 902, 904, 906, 908, 910, 912 is identical and comprises an elongate zigzag section 916 which terminates at each end in an angled portion 914, 918, set at angle of approximately 30° to the longitudinal axis of the elongate section 916. Each of the angled portions 914, 918 includes means (not shown) for mounting the rail on the drive means (not shown) for driving in the direction shown by the arrow A. A plurality of elements 920, 922, 924, 926, 928, 930, 932, 934, 936, 938, 940, 942, 944, 946, 948 are mounted on the rails, the sides 950, 952 of adjacent elements 920, 922 contacting each other.

Figure 10:
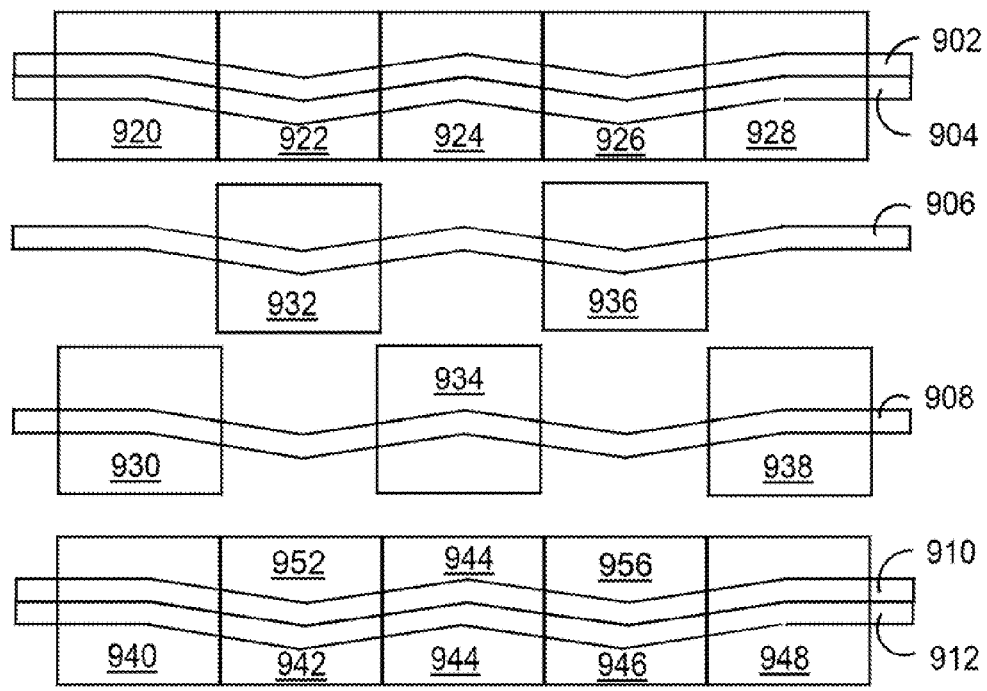
FIG. 10 is a plan view from above of the tooling system of FIG. 9 in the open position.

In FIG. 10, the array of FIG. 9 is shown in an open position. As can be seen from FIG. 10, the rails 902 and 904 together with the elements 920, 922, 924, 926 and 928 mounted on these rails have been moved away from the rail 906. The rail 906 has itself been moved away from the rail 908, which has itself been moved away from the rail 910 so that the elements 930, 932, 934, 936 and 938 do not contact adjacent elements. In this configuration each of the elements 930, 932, 934, 936 and 938 can independently be moved vertically relative to the other elements according to the method described in WO 02/064308 A1.

Figure 11:
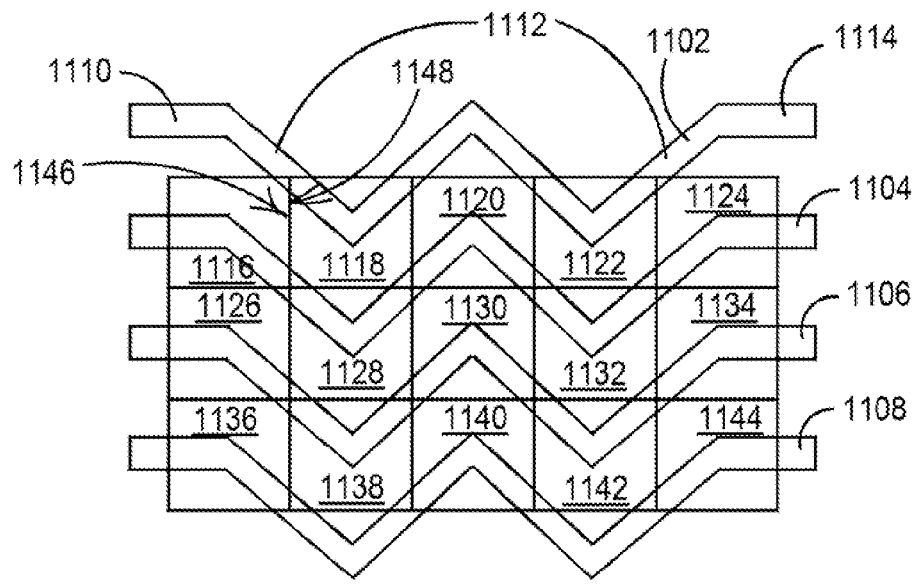
FIG. 11 is a plan view from above of the supporting rails and elements of a sixth embodiment of a tooling system, in the closed position

As can be seen from FIG. 11, a plurality of supporting rails 1102, 1104, 1106, 1108 are arranged in an array. Each of the rails 1102, 1104, 1106, 1108 is identical and comprises an elongate zigzag section 1112 which terminates at each end in an angled portion 1110, 1114, set at angle of approximately 45° to the longitudinal axis of the elongate section 1112. Each of the angled portions 1110, 1114 includes means (not shown) for mounting the rail on the drive means (not shown) for driving in the direction shown by the arrow A. A plurality of elements 1116, 1118, 1120, 1122, 1124, 1126, 1128, 1130, 1132, 1134, 1136, 1138, 1140, 1142, 1144 are mounted on the rails, the sides 1146, 1148 of adjacent elements 1116, 1118 contacting each other.

Figure 12:
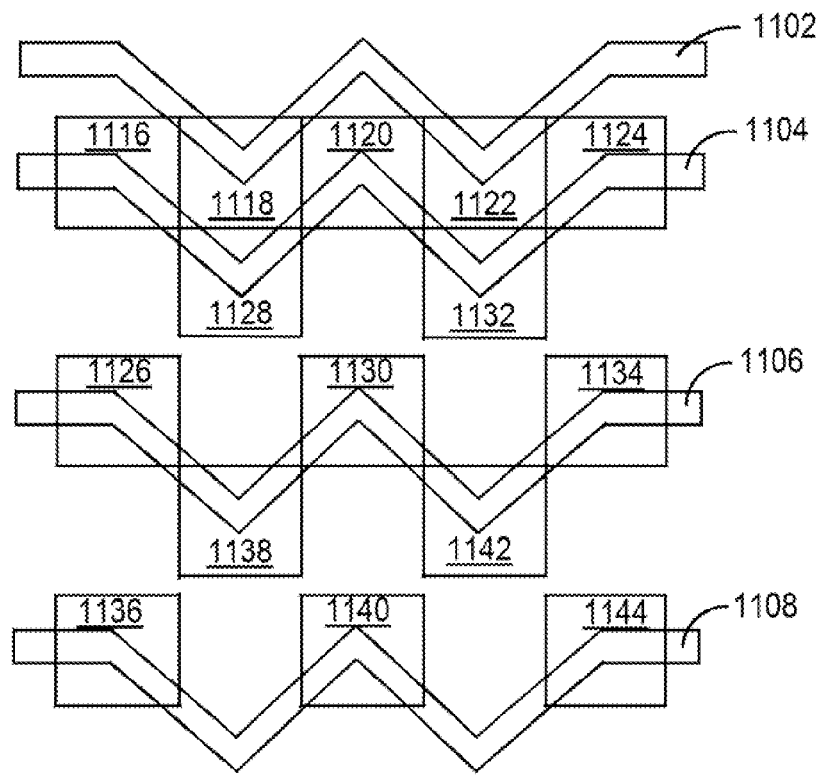
FIG. 12 is a plan view from above of the tooling system of FIG. 11 in the open position.

In FIG. 12, the array of FIG. 11 is shown in an open position. As can be seen from FIG. 12, the rails 1102 and 1104 together with the elements 1116, 1118, 1120, 1122, 1124, 1128 and 1132 mounted on these rails have been moved away from the rail 1106. The rail 1106 has itself been moved away from the rail 1108, so that the elements 1126, 1130, 1134, 1138 and 1142 do not contact adjacent elements by means of their sides but only contact adjacent elements mounted on the same rail at their vertices. In this configuration each of the elements 1126, 1130, 1134, 1138 and 1142 can independently be moved vertically relative to the other elements according to the method described in WO 02/064308 A1.

The tooling system has been described with reference to the method described in WO 02/064308 A1, but is also suitable for use in other tooling systems, for example those described in International Patent Applications Nos WO 05/061147 A1; WO 05/061182 A1; WO 05/061183 A1 and GB 2005/002533 and GB Patent Application No 04283396.

The invention claimed is:
1. A tooling system comprising:
   a plurality of elements arranged in an array and mounted on supporting rails, the elements of the array being movable between a closed position in which the elements have tessellating sides and in which the sides of adjacent elements contact one another and are secure in position, and an open position in which at least some of the elements of the array are spaced apart and are capable of vertical movement relative to one another, and
   a drive configured to drive the array between open and closed positions along a drive axis that is at an angle to a longitudinal axis of the supporting rails, wherein each supporting rail has mounted thereon more than one element in the array such that the elements mounted on each rail are not adjacent elements of a row or column of the array.
2. A tooling system according to claim 1, wherein the elements are substantially rectangular in plan, and the drive axis is substantially parallel to the sides of these elements.

3. A tooling system as claimed in claim 1, wherein the supporting rails are mounted at an angle of 45° or less to the drive axis.

4. A tooling system as claimed in claim 1, wherein the supporting rails are mounted at an angle of 30° to the drive axis.

5. A tooling system as claimed in claim 1, wherein the supporting rails are provided with engagement means which co-operate with the drive means and are perpendicular to the drive axis.

6. A tooling system as claimed in claim 1, wherein the supporting rails are provided with engagement means which co-operate with the drive means and are at an angle to the drive axis.

7. A tooling system as claimed in claim wherein the elements of the array are provided with inter-element interlocking and/or alignment features.

* * * * *